United States Patent [19]
Barison

[11] Patent Number: 5,654,787
[45] Date of Patent: Aug. 5, 1997

[54] EYEWEAR AND INFORMATION HOLDER

[76] Inventor: Joseph L. Barison, P.O. Box 9787, Denver, Colo. 80209

[21] Appl. No.: 549,127

[22] Filed: Oct. 27, 1995

[51] Int. Cl.$^6$ .............................. G02C 11/02; G02C 3/00
[52] U.S. Cl. .............................. 351/52; 351/51; 351/157
[58] Field of Search .................................. 351/156, 157, 351/158, 51, 52, 41, 140, 121, 111; 24/3.3

[56] References Cited

U.S. PATENT DOCUMENTS

| | | | |
|---|---|---|---|
| 4,968,128 | 11/1990 | Mendola | 351/52 |
| 5,087,118 | 2/1992 | Gill | 351/157 |

FOREIGN PATENT DOCUMENTS

| | | |
|---|---|---|
| 682352 | 11/1952 | United Kingdom . |
| 781333 | 8/1957 | United Kingdom . |

*Primary Examiner*—Hung X. Dang
*Attorney, Agent, or Firm*—Edwin H. Crabtree; Ramon L. Pizarro; Donald W. Margolis

[57] ABSTRACT

Eyewear and information holder for holding eyewear and information next to a user of the holder. The holder includes an elongated strap having a first end and a second end. The first end is attached to one end of a first flexible retainer. The second end is attached to one end of a second flexible retainer. The first and second retainers include a stud opening and a temple member opening. When the holder is used for holding eyewear, the temple member openings are adapted for receiving a first and a second temple member therethrough of a pair of eyeglasses. A first and a second advertising piece with an attachment stud on the back of each piece are secured next to the sides of the retainers with the attachment stud received through the stud openings. When the holder is used for holding the various types of information, the temple member openings are adapted for receiving a first and a second engagement arm of a connector device. The connector device includes a foldable attachment arm with tube member thereon and a post extending outwardly from the connecter device. The post is adapted for insertion through an opening in a frame used for holding and displaying different types of information. The attachment arm is folded over and the tube member is inserted around the post securing the frame to the connector device. The strap of the holder is then placed around the neck and both the information and the advertising pieces are displayed next to the user of the holder.

12 Claims, 2 Drawing Sheets

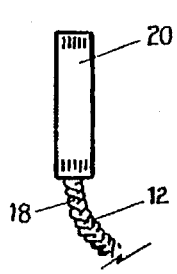
FIG. 1
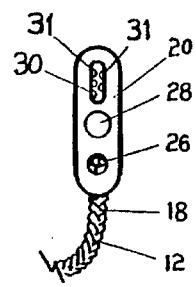
FIG. 2
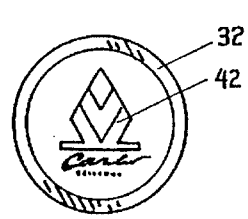
FIG. 3
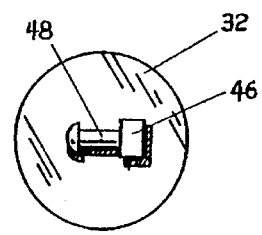
FIG. 4
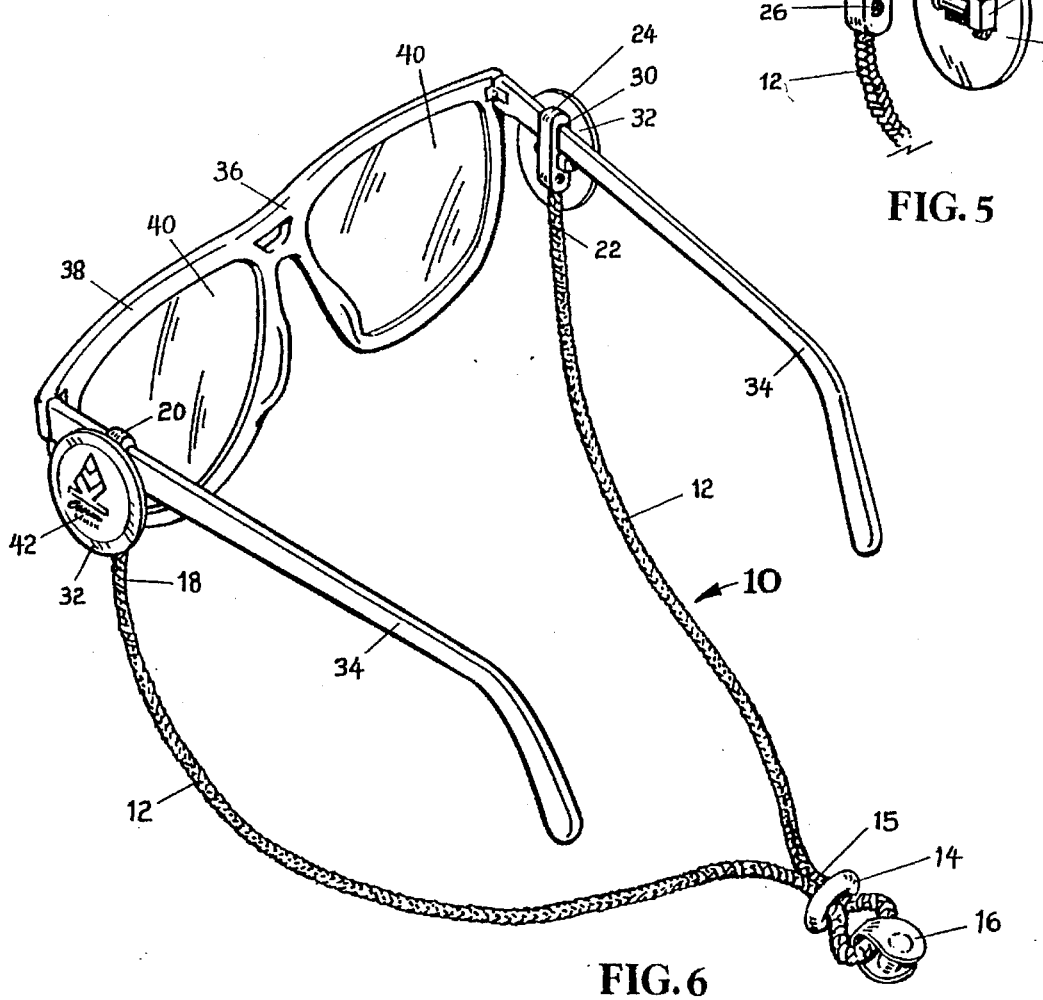
FIG. 5
FIG. 6

EYEWEAR AND INFORMATION HOLDER

BACKGROUND OF THE INVENTION (a) Field of the Invention

This invention relates to an eyewear holder and more particularly, but not by way of limitation, to a combination eyewear holder and information holder for displaying advertising pieces and various types of information thereon.

(b) Discussion of Prior Art

Heretofore there have been a variety of different types of patents related to holding eyewear. U.S. Pat. Nos. 4,783,164 to Heiberger, 4,136,934 to Seron, 4,927,258 to McKenna, 5,367,347 to Wilson et al., 3,397,026 to Spina and 4,976,531 to Kahaney describe different types of bushings designed to retain an eyeglass strap to the ends of an eyeglass temple member.

U.S. Pat. No. 4,968,128 to Mendola discloses the use of an eyeglass attachment to slip over or through the eyeglass frame. The attachment is used to hold ornaments such as ear rings, pins, charms, etc. The attachment is not used for holding an eyeglass strap.

Further, U.S. Pat. No. 2,555,578 to Davis, British Patent 781,330 to Rosser et al. and British Patent 682,352 to Jay et al. teach placing ornamentation on the frames of glasses.

None of the above mentioned patents disclose the unique features and structure of the subject eyewear and information holder for holding eyewear and different types of information next to a user of the holder.

SUMMARY OF THE INVENTION

In view of the foregoing, it is an object of the present invention to provide both an eyewear holder and an information holder for holding eyewear and various types of information next to a user of the holder.

Another object of the invention is to provide an eyewear holder for displaying an advertising piece with a company name, logo, club, organization, motto, licensed image, licensed name, licensed logo, etc. thereon.

Still another object of the holder is the advertising piece when used next to eyewear acts as a shield from ultraviolet light and a guard against foreign objects.

Yet another object of the invention is the eyewear holder includes a flexible retainer adaptable for engaging different sizes and styles of temple members attached to different types of eyewear frames.

Another object of the invention is to provide a combination eyewear holder and information holder wherein various types of information can be displayed and suspended from the information holder when not used as an eyewear holder.

The subject invention provides an elongated strap having a first end and a second end. The first end is attached to one end of a first flexible retainer. The second end is attached to one end of a second flexible retainer. The first and second retainers include a stud opening and a temple member opening. When the holder is used for holding eyewear, the temple member openings are adapted for receiving a first and a second temple member therethrough of a pair of eyewear. A first and a second advertising piece with an attachment stud on the back of each piece are secured next to the sides of the retainers with the attachment stud received through the stud openings. When the holder is used for holding the information, the temple member openings are adapted for receiving a first and a second engagement arm of a connector device. The connector device includes a foldable attachment arm with tube member thereon and a post extending outwardly from the connecter device. The post is adapted for insertion through an opening in a frame used for holding information thereon. The attachment arm is folded over and the tube member is inserted around the post securing the frame to the connector device. The strap of the holder is then placed around the neck and both the information and the advertising pieces are displayed next to the a user.

These and other objects of the present invention will become apparent to those familiar with the eyewear holders and different types of information holders when reviewing the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a side view of the flexible retainer with a portion of an elongated strap attached to end of the retainer.

FIG. 2 is a front view of the flexible retainer showing a stud opening and a temple member opening through the retainer.

FIG. 3 is a front view of an advertising piece with a company logo printed on the piece.

FIG. 4 is a rear view of the advertising piece with an attachment stud used for securing the advertising piece to the flexible retainer.

FIG. 5 is a perspective view of the flexible retainer and advertising piece with the attachment stud positioned for insertion through the stud opening in the retainer.

FIG. 6 is a perspective view of the eyewear and information holder mounted on the temple members of a pair of eyeglasses.

DESCRIPTION OF THE PREFERRED EMBODIMENTS

Figure 8:
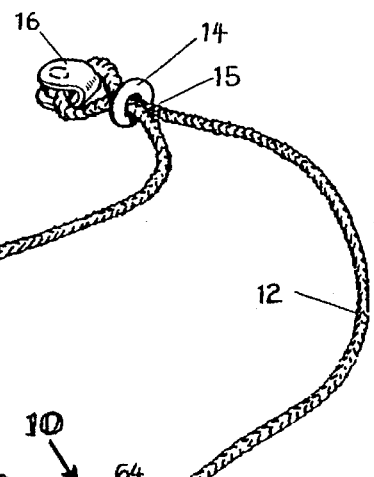
FIG. 8 is a front view of a portion of the connector device with an engagement arm inserted through the temple member opening for holding the flexible retainer and advertising piece thereon.
Figure 8:
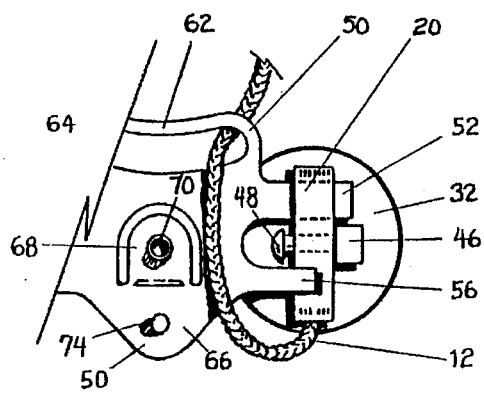

Referring to both FIG. 1 and FIG. 6, the subject eyewear and information holder is designated by general reference numeral 10. The holder 10 includes an elongated strap 12 used for receipt around the neck of a user. The strap 12 includes an "O" ring 14 mounted around a doubled portion 15 of the strap 12 therethrough and "O" ring retainer 16 which is secured around a portion of the strap 12 to prevent the "O" ring 14 from coming loose or falling off the strap 12. By moving the "O" ring 14 forward or backward on the doubled portion 15 of the strap 12, the strap 12 can be tightened or loosened when in use.

The strap 12 has a first end 18 attached to one end of a first flexible retainer 20. A second end 22 of the strap 12 is attached to one end of a second flexible retainer 24. In FIG. 1 a side view of the first flexible retainer 20 is shown. The retainers 20 and 24 may be made of rubber, plastic and any other similar type material.

Referring now to both FIG. 2 and FIG. 6, the first flexible retainer 20 and the second flexible retainer 24 are identical. In FIG. 2 the first retainer 20 is shown with a mounting hole 26 used for pinning and securing the strap 12 to the retainer 20. The two retainers 20 and 24 also include a stud opening 28 and a temple member opening 30. The stud opening 28 is used for securing an advertising piece 32 to the retainers 20 and 24. The temple member opening 30 is used for receiving the two temple members 34 of a pair of eyewear 36 having a frame 38 with lenses 40. The temple member opening 30 being part of the flexible retainers 20 and 24 is expandable for receipt around different sizes and shapes of temple members 34. The opening 30 also includes opposite sides with off set temple member engaging ribs 31 for aid in the securing of retainers 20 and 24 on the temple members 34 and to prevent the retainers 20 and 24 from easily slipping along the length of the temple members 34.

The retainers 20 and 24 in FIG. 6 are shown adjusted next to the frame 38 and adjacent the side of the eyes of a user for protecting the user from ultraviolet light and foreign objects during the use of the eyewear 36. The eyewear 36 may be prescription eyeglasses, sunglasses, eye protection glasses, safety glasses or any other form of eyewear.

Figure 9:
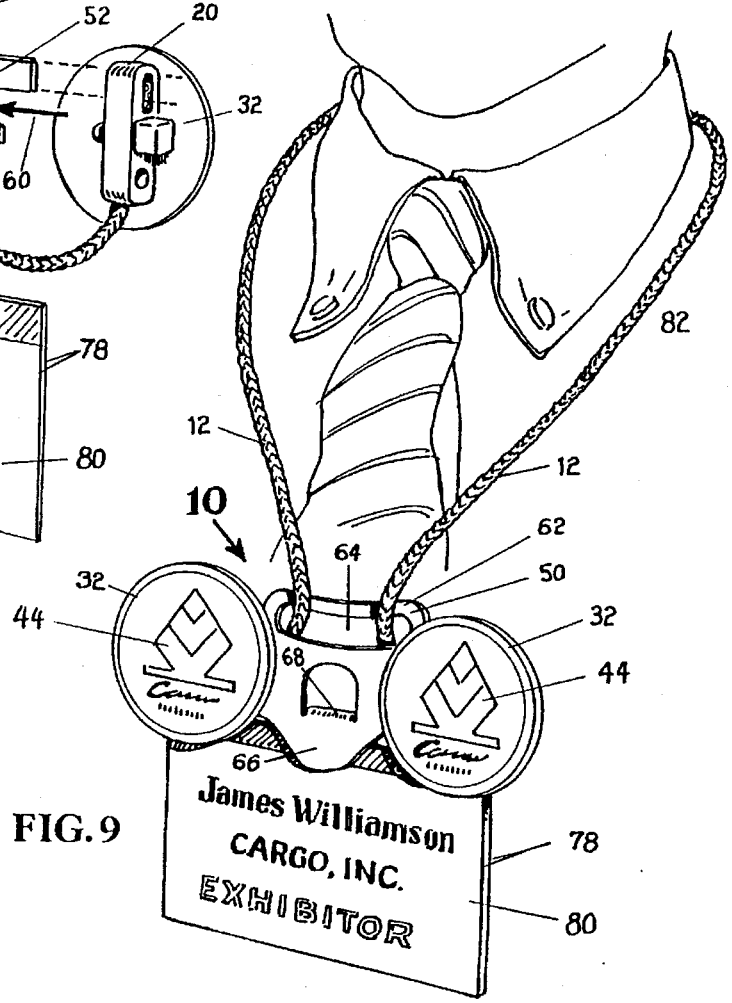
FIG. 9 is a perspective view of the eyewear and information holder having a frame with information received therein with the elongated strap received around the neck of a user of the subject invention.

In FIG. 3 a front view of the advertising piece 32 is shown with a company logo 42 thereon. The advertising piece 32 can also include a company name 44 as shown in FIG. 9, the name of an organization, a company motto or symbol and other trade related information. FIG. 4 illustrates a rear view of the advertising piece 32 having a standard 46 with an attachment stud 48 extending outwardly from the standard 46 and parallel to the planar surface of the advertising piece 32.

In FIG. 5, a perspective view of one of the advertising pieces 32 is shown with the attachment stud 48 positioned for insertion into the stud opening 28 of the second flexible retainer 24. In FIG. 6 the two advertising pieces 32 are shown attached to the first and second flexible retainers 20 and 24.

While the attachment stud 48 and stud opening 28 are shown in the drawings, it can be appreciated that various other types of attachment devices could work equally well in releasably securing the advertising pieces 32 to the flexible retainers 20 and 24 without departing from the spirit and scope of the invention as described herein.

Figure 7:
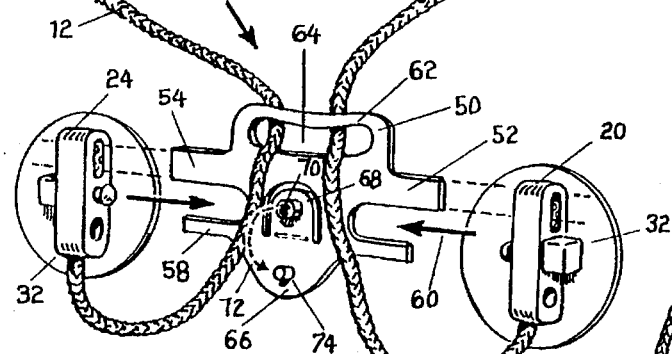
FIG. 7 is a perspective view of the eyewear and information holder positioned for attachment to a connector device. The connector device having an attachment arm used for securing a frame used for holding different types of information thereon.
Figure 7:
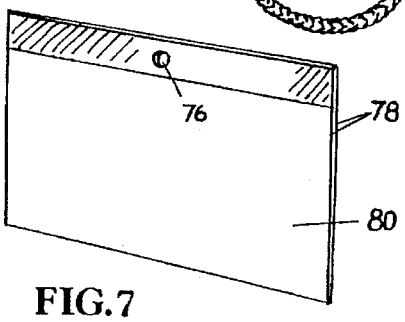

In FIG. 7, the subject invention is shown as an information holder and includes a connector device 50 having a first and second engagement arms 52 and 54 and a first and second support arms 56 and 58 extending outwardly from the sides of the connector device 50. The back of the connector device 50 is shown in FIG. 7. The engagement arms 52 and 54 are adapted for receipt through the temple member openings 30 as indicated by arrows 60. The support arms 56 and 58 are used to support the back of the retainers 20 and 24 and hold the retainers 20 and 24 flush against the back surface of the advertising piece 32.

The connector device 50 also includes an upper portion 62 having an opening 64 therein for receiving a portion of the strap 12 therethrough. The opening 64 assists in proper positioning of the strap 12 on the connector device 50 and for receipt around the neck of the user as shown in FIG. 9.

A lower portion 66 of the connector device 50 includes a cut out inverted "U" shaped attachment arm 68 with a tube member 70 which is folded as indicated by arrow 72 and inserted around a post 74 extending outwardly from the lower portion 66. The post 74 is adapted for receipt through a hole 76 in a clear plastic frame 78 or pouch for holding an information card 80 or other types of information. The attachment arm 68 is then folded over and the tube member 70 inserted around the post 74 securing the information card 80 and frame 78 to the connector device 50.

While the frame 78 and information card 80 are shown in the drawings, it should be kept in mind that information attached to the connector device 50 can be displayed without a frame and may take on various formats such as a personal identification badge, a photograph, a trade show identification card, a security card, a business card, an advertising card, credit and debit cards, 3 dimensional informational objects and like examples. Also, the information can be secured to the connector device 50 using various securing devices other than using the attachment arm 68, tube member 70 and post 74.

In FIG. 8 a rear view of a portion of the connector device 50 is shown with the first engagement arm 52 received through the temple member opening 30 and the first support arm 56 resting behind the first flexible retainer 20. The rear of the advertising piece 32 is shown with the attachment stud 48 received through the stud opening 28.

In FIG. 9 a perspective view of the front of the connector device 50 is shown with the information card 80 mounted thereon and disposed next to a user 82 of the subject eyewear and information holder 10. In this view the strap 12 is shown received around the neck of the user 82. Also, the advertising pieces 32 are attached to the first and second engagement arms 52 and 54 and the company name 44 on the advertising pieces 32 is prominently display next to the information card 80.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. An eyewear holder for holding eyewear and information next to a user, the holder releasable secured to a pair of temple members of the eyewear, the holder comprising:

an elongated strap having a first end and a second end;

a first retainer, the first end of said strap attached to said first retainer;

a second retainer, the second end of said strap attached said second retainer, said first and second retainers adapted for releasable receipt around a portion of the temple members of the eyewear; and a pair of advertising pieces releasable attached to the sides of said first and second retainers for displaying advertising thereon.

2. The holder as described in claim 1 wherein said first and second retainers include a temple member opening therein for receiving the temple members of the eyewear therethrough.

3. The holder as described in claim 1 wherein said advertising pieces include a front portion with advertising thereon and a rear portion with attachment means for securing the advertising pieces to said first and second retainers.

4. The holder as described in claim 1 wherein said first and second retainers are made of a flexible material for ease in securing said retainers to the eyewear.

5. The holder as described in claim 1 further including adjustment means on said strap for adjusting the tightness and looseness of said strap when in use.

6. An eyewear holder for holding eyewear and information next to a user of the holder, the holder releasable secured to a pair of temple members of the eyewear, the holder comprising:

an elongated strap having a first end and a second end;

a first flexible retainer, the first end of said strap attached to said first retainer, said first retainer having a temple member opening therein and adapted for receiving different sizes and shapes of temple members therethrough;

a second flexible retainer, the second end of said strap attached said second retainer, said second retainer having a temple member opening therein and adapted for receiving different sizes and shapes of temple members therethrough; and a pair of advertising pieces releasable attached to the sides of said first and second retainers for displaying advertising thereon.

7. The holder as described in claim 6 wherein said advertising pieces include a front portion with advertising thereon and a rear portion with attachment means, said attachment means used for releasably securing the advertising pieces to said first and second retainers.

8. An eyewear holder for holding eyewear and information next to a user of the holder, the holder releasable secured to a pair of temple members of the eyewear, the holder comprising:

an elongated strap having a first end and a second end;

a first retainer, the first end of said strap attached to said first retainer, said first retainer having a temple member opening therein and adapted for receiving different sizes and shapes of temple members therethrough;

a second retainer, the second end of said strap attached said second retainer, said second retainer having a temple member opening therein and adapted for receiving different sizes and shapes of temple members therethrough; and a pair of advertising pieces each having a front portion with advertising thereon and a rear portion with a standard, said standard having an attachment stud extending outwardly therefrom, said attachment stud parallel to a planar surface of the advertising piece, said attachment studs releasably attached to said first and second retainers.

9. The holder as described in claim 8 wherein said first and second retainers include stud openings for releasable receipt of said attachment studs therein.

10. The holder as described in claim 8 wherein said first and second retainers are made of a flexible material for ease in securing said retainers to the eyewear.

11. The holder as described in claim 8 further including adjustment means on said strap for adjusting the tightness and looseness of said strap when in use.

12. The holder as described in claim 8 wherein said temple member openings in said first and second retainers include off set temple member engaging ribs for aid in securing said first and second retainers on the temple members.

* * * * *